(12) United States Patent
Zhao et al.

(10) Patent No.: US 10,748,476 B2
(45) Date of Patent: Aug. 18, 2020

(54) DISPLAY PANEL, METHOD FOR DRIVING THE SAME, AND DISPLAY DEVICE

(71) Applicant: Shanghai Tianma AM-OLED Co., Ltd., Shanghai (CN)

(72) Inventors: Zhe Zhao, Shanghai (CN); Xingyao Zhou, Shanghai (CN); Haojie Xu, Shanghai (CN); Yana Gao, Shanghai (CN); Yue Li, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 16/202,001

(22) Filed: Nov. 27, 2018

(65) Prior Publication Data

US 2019/0347987 A1   Nov. 14, 2019

(30) Foreign Application Priority Data

May 14, 2018   (CN) .......................... 2018 1 0454661

(51) Int. Cl.
*G09G 3/3225* (2016.01)
*G06K 9/00* (2006.01)

(52) U.S. Cl.
CPC ......... *G09G 3/3225* (2013.01); *G06K 9/0004* (2013.01); *G09G 2300/0809* (2013.01);
(Continued)

(58) Field of Classification Search
CPC ......... G09G 3/3225; G09G 2300/0809; G09G 2320/064; G09G 2320/0686;
(Continued)

(56) References Cited

U.S. PATENT DOCUMENTS

| 10,095,910 | B2* | 10/2018 | He | G06F 3/044 |
| 2019/0095674 | A1* | 3/2019 | Ko | H01L 27/3227 |
| 2019/0130155 | A1* | 5/2019 | Park | G09G 3/3208 |

FOREIGN PATENT DOCUMENTS

CN    107819011 A    3/2018

OTHER PUBLICATIONS

First Office Action, dated Aug. 7, 2019, issued in corresponding Chinese Patent Application No. 201810454661.X, filed May 14, 2018, 19 pages.

* cited by examiner

*Primary Examiner* — Stacy Khoo
(74) *Attorney, Agent, or Firm* — Christensen O'Connor Johnson Kindness PLLC

(57) ABSTRACT

The present disclosure provides a display panel, a method for driving the display panel, and a display device. The display panel includes a control unit including first and second processing circuits. A pixel circuit located within the fingerprint recognition region is connected to the first and second processing circuits of the corresponding control unit. In the fingerprint recognition mode, a pixel circuit located within the non-fingerprint recognition region receives a first light emission control signal, so that the light-emitting element does not emit light in first period and second sub-period and emits light in first sub-period. The second processing circuit provides a second light emission control signal, and a pixel circuit located within fingerprint recognition region responds to the second light emission control signal, so that the light-emitting element does not emit light in first period and emits light in first sub-period and second sub-period.

17 Claims, 8 Drawing Sheets

(52) U.S. Cl.
CPC ............. *G09G 2320/064* (2013.01); *G09G 2320/0686* (2013.01)

(58) Field of Classification Search
CPC .. G09G 3/3208; G09G 3/3233; G09G 3/3266; G09G 2300/0819; G09G 2300/0842; G09G 2300/0852; G09G 2300/0861; G09G 2320/0238; G09G 2320/0626; G09G 2380/00; G06K 9/0004; G06K 7/14; H01L 27/3227
See application file for complete search history.

DISPLAY PANEL, METHOD FOR DRIVING THE SAME, AND DISPLAY DEVICE

CROSS-REFERENCE TO RELATED APPLICATIONS

The present disclosure claims priority to Chinese Patent Application No. 201810454661.X, filed on May 14, 2018, the content of which is incorporated herein by reference in its entirety.

TECHNICAL FIELD

The present disclosure relates to the field of display technologies, and in particular, to a display panel, a method for driving the display panel, and a display device.

BACKGROUND

For a display panel having a fingerprint recognition function, in order to better achieve full-screen design and prevent a fingerprint recognition region from occupying space of a non-display area, at present, the under-screen fingerprint technology can be adopted so as to reuse a part of a display area as the fingerprint recognition region and use light emitted by sub-pixels within the fingerprint recognition region as light for use in fingerprint recognition.

During the fingerprint recognition process, it is usually required that the sub-pixels within the fingerprint recognition region emit light with high brightness to improve the detection accuracy. However, in the existing design, the light emission brightness of the sub-pixels within the fingerprint recognition region cannot be separately controlled, and it is only possible to increase the overall brightness of the sub-pixels within the entire display area. In this way, when performing the fingerprint recognition, the brightness of the overall image displayed on the display panel may change, thereby affecting the user experience.

SUMMARY

In view of this, an embodiment of the present disclosure provides a display panel, a method for driving the display panel, and a display device, which can separately control the light emission brightness of sub-pixels within the fingerprint recognition region, and when switching between non-fingerprint recognition mode and the fingerprint recognition mode, it can effectively reduce the brightness difference of the overall display image, thereby improving the user experience.

In a first aspect, the present disclosure provides a display panel. The display panel is divided into a display area and a non-display area. The display area includes a fingerprint recognition region and a non-fingerprint recognition region. A plurality of sub-pixels is arranged in the display area, and each of the plurality of sub-pixels includes a pixel circuit and a light-emitting element that are electrically connected to each other. The display panel further includes a plurality of control units, one of the plurality of control units corresponds to one row of sub-pixels of the plurality of sub-pixels within the fingerprint recognition region, and each of the plurality of control units includes at least one first processing circuit and at least one second processing circuit; for each sub-pixel located within the fingerprint recognition region, the pixel circuit is electrically connected to the first processing circuit and the second processing circuit of a corresponding control unit of the plurality of control units through a first node. Operating modes of the display panel include a non-fingerprint recognition mode and a fingerprint recognition mode, and in both the non-fingerprint recognition mode and in the fingerprint recognition mode, a driving cycle of each pixel circuit includes a first period and a second period. The second period includes a plurality of first sub-periods and a plurality of second sub-periods that are alternate. In the non-fingerprint recognition mode, for each sub-pixel located within the non-fingerprint recognition region, the pixel circuit receives and responds to a first light emission control signal, in each first period and in each second sub-period, the first light emission control signal is at a non-enabling level such that the corresponding light-emitting element does not emit light, and in each first sub-period, the first light emission control signal is at an enabling level such that the corresponding light-emitting element emits light; for each sub-pixel located within the fingerprint recognition region, the first processing circuit provides the first light emission control signal to the first node, and the pixel circuit responds to the first light emission control signal, in the first period and in each second sub-period, the first light emission control signal is at the non-enabling level such that the corresponding light-emitting element does not emit light, and in each first sub-period, the first light emission control signal is at the enabling level such that the corresponding light-emitting element emits light. In the fingerprint recognition mode, for each sub-pixel located within the non-fingerprint recognition region, the pixel circuit receives and responds to the first light emission control signal, in each first period and in each second sub-period, the first light emission control signal is at the non-enabling level such that the corresponding light-emitting element does not emit light, and in each first sub-period, the first light emission control signal is at an enabling level such that the corresponding light-emitting element emits light; for each sub-pixel located within the fingerprint recognition region, the second processing circuit provides a second light emission control signal to the first node, and the pixel circuit responds to the second light emission control signal, in each first period, the second light emission control signal is at the non-enabling level such that the corresponding light-emitting element does not emit light, and in each first sub-period and in each second sub-period, the second light emission control signal is at the enabling level such that the corresponding light-emitting element emits light.

In a second aspect, the present disclosure provides a method for driving a display panel, which is applied in the display panel according to the first aspect. Operating modes of the display panel include a non-fingerprint recognition mode and a fingerprint recognition mode, and in both the non-fingerprint recognition mode and in the fingerprint recognition mode, a driving cycle of each pixel circuit includes a first period and a second period, the second period including a plurality of first sub-periods and a plurality of second sub-periods that are alternate. The method for driving the display panel includes: in the non-fingerprint recognition mode, for each sub-pixel located within the non-fingerprint recognition region, the pixel circuit receiving and responding to a first light emission control signal, in each first period and in each second sub-period, the first light emission control signal being at a non-enabling level, the corresponding light-emitting element emitting no light, and in each first sub-period, the first light emission control signal being at an enabling level, the corresponding light-emitting element emitting light; for each sub-pixel located within the fingerprint recognition region, the first processing circuit providing the first light emission control signal to the first node, and the pixel circuit responding to the first light emission control signal, in each first period and in each second sub-period, the first light emission control signal being at the non-enabling level, the corresponding light-emitting element emitting no light, and in each first sub-period, the first light emission control signal being at the enabling level, the corresponding light-emitting element emitting light; in the fingerprint recognition mode, for each sub-pixel located within the non-fingerprint recognition region, the pixel circuit receiving and responding to a first light emission control signal, in each first period and in each second sub-period, the first light emission control signal being at the non-enabling level, the corresponding light-emitting element emitting light, and in each first sub-period, the first light emission control signal being at the enabling level, the corresponding light-emitting element emitting light; for each sub-pixel located within the fingerprint recognition region, the second processing circuit providing a second light emission control signal to the first node, and the pixel circuit responding to the second light emission control signal, in each first period, the second light emission control signal being at the non-enabling level, the corresponding light-emitting element emitting no light, and in each first sub-period and in each second sub-period, the second light emission control signal being at the enabling level, and the corresponding light-emitting element emitting light.

In a third aspect, the present disclosure provides a display device, and the display device includes the display panel according to the first aspect.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. Obviously, the drawings described as follows are merely part of the embodiments of the present disclosure, other drawings can also be acquired by those skilled in the art without paying creative efforts.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that although the light emission control signal may be described using the terms of "first", "second", etc., in the embodiments of the present disclosure, the light emission control signal will not be limited to these terms. These terms are merely used to distinguish light emission control signals from one another. For example, without departing from the scope of the embodiments of the present disclosure, a first light emission control signal may also be referred to as a second light emission control signal, similarly, a second light emission control signal may also be referred to as a first light emission control signal.

Figure 1:
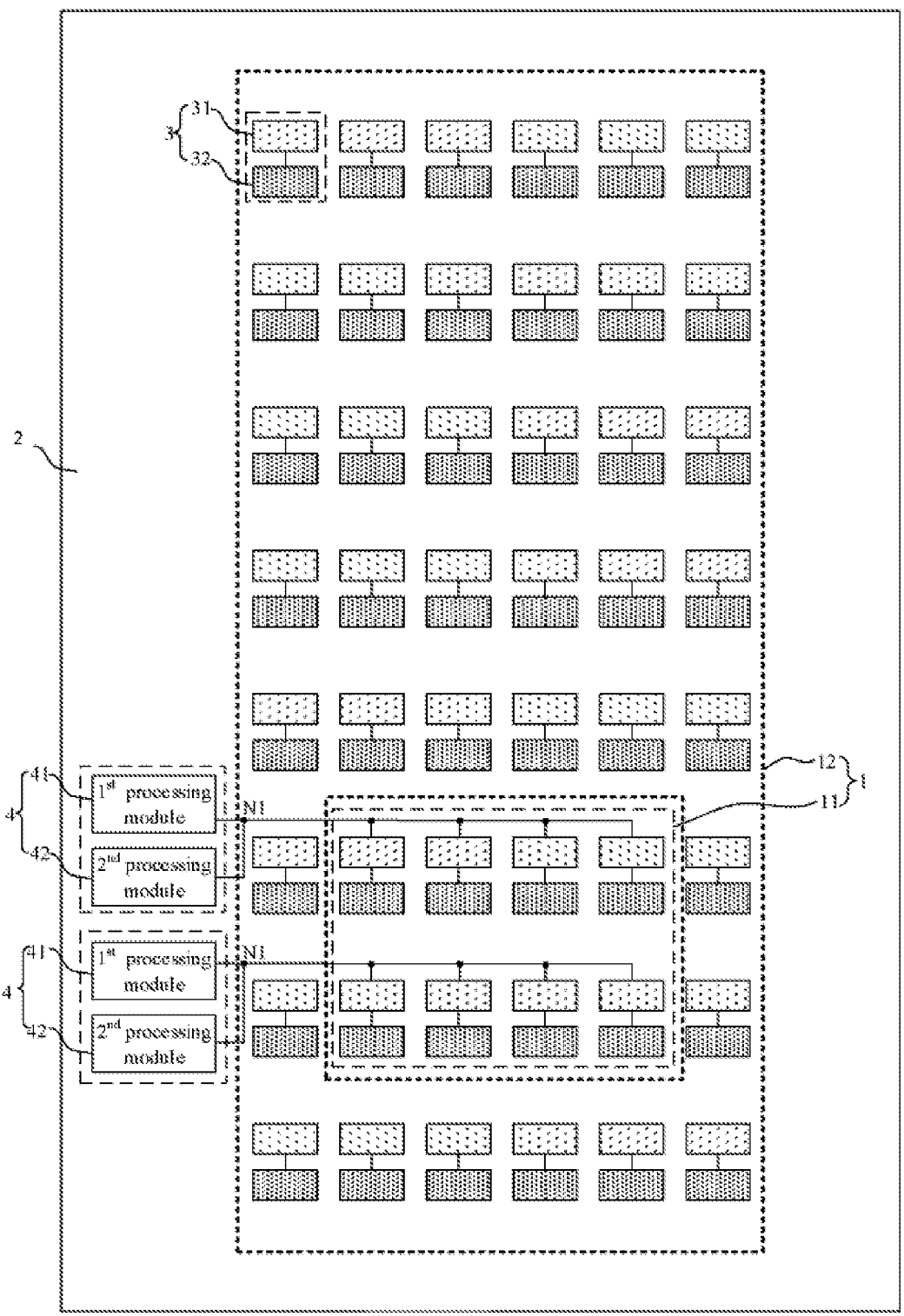
FIG. 1 is a schematic structural diagram of a display panel according to an embodiment of the present disclosure.

An embodiment of the present disclosure provides a display panel. As shown in FIG. 1, which is a schematic structural diagram of a display panel according to an embodiment of the present disclosure, the display panel includes a display area 1 and a non-display area 2. The display area 1 includes a fingerprint recognition region 11 and a non-fingerprint recognition region 12. A plurality of sub-pixels 3 is provided in the display area, and each sub-pixel 3 includes a pixel circuit 31 and a light-emitting element 32 that are electrically connected to each other.

The display panel further includes a plurality of control units 4, and one control unit 4 corresponds to a row of sub-pixels 3 within the fingerprint recognition region 11. Each control unit 4 includes a first processing circuit 41 and a second processing circuit 42. For sub-pixels 3 located within the fingerprint recognition region 11, the pixel circuits 31 are electrically connected to the first processing circuit 41 and the second processing circuit 42 of the corresponding control unit 4 through a first node N1.

Figure 2:
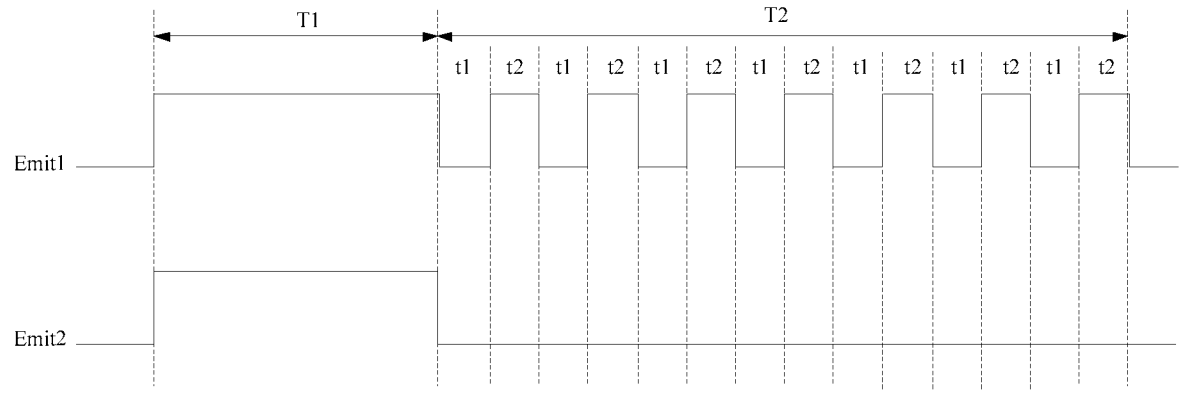
FIG. 2 is a signal sequence diagram of a first light emission control signal and a second light emission control signal according to an embodiment of the present disclosure.

Operating modes of the display panel include a non-fingerprint recognition mode and a fingerprint recognition mode. As shown in FIG. 2, which is a signal sequence diagram of a first light emission control signal and a second light emission control signal according to an embodiment of the present disclosure, in both the non-fingerprint recognition mode and the fingerprint recognition mode, a driving cycle of the pixel circuit 31 includes a first period T1 and a second period T2, and the second period T2 includes a plurality of first sub-periods t1 and a plurality of second sub-periods t2 that are alternate.

In the non-fingerprint recognition mode, for each sub-pixel 3 located within the non-fingerprint recognition region 12, the pixel circuit 31 receives and responds to a first light emission control signal Emit1. In the first period T1 and in the second sub-period t2, the first light emission control signal Emit1 is at a non-enabling level (a high level as shown in FIG. 2), and the corresponding light-emitting element 32 does not emit light. In the first sub-period t1, the first light emission control signal Emit1 is at an enabling level (a low level as shown in FIG. 2), and the corresponding light-emitting element 32 emits light.

In the non-fingerprint recognition mode, for each sub-pixel 3 located within the fingerprint recognition region 11, the first processing circuit 41 provides a first light emission control signal Emit1 to the first node N1, and the pixel circuit 31 responds to the first light emission control signal Emit1. In the first period T1 and in the second sub-period t2, the first light emission control signal Emit1 is at a non-enabling level, and the corresponding light-emitting element 32 does not emit light. In the first sub-period t1, the first light emission control signal Emit1 is at an enabling level, and the corresponding light-emitting element 32 emits light.

In the fingerprint recognition mode, for each sub-pixel 3 located within the non-fingerprint recognition region 12, the pixel circuit 31 receives and responds to the first light emission control signal Emit1. In the first period T1 and in the second sub-period t2, the first light emission control signal Emit1 is at a non-enabling level, and the corresponding light-emitting element 32 does not emit light. In the first sub-period t1, the first light emission control signal Emit1 is at an enabling level, and the corresponding light-emitting element 32 emits light.

In the fingerprint recognition mode, for each sub-pixel 3 located within the fingerprint recognition region 11, the second processing circuit 42 provides a second light emission control signal Emit2 to the first node N1, and the pixel circuit 31 responds to the second light emission control signal Emit2. In the first period T1, the second light emission control signal Emit2 is at a non-enabling level (a high level as shown in FIG. 2), and the corresponding light-emitting element 32 does not emit light. In the first sub-period t1 and in second sub-period t2, the second light emission control signal Emit2 is at an enabling level (a low level as shown in FIG. 2), and the corresponding light-emitting element 32 emits light.

In the display panel provided by an embodiment of the present disclosure, light emission states of the sub-pixels 3 located within the fingerprint recognition region 11 can be separately controlled by using the first processing circuit 41 and the second processing circuit 42. In the non-fingerprint recognition mode, the first processing circuit 41 provides a first light emission control signal Emit1 to the pixel circuit 31 of the sub-pixel 3 located within the fingerprint recognition region 11, so that the sub-pixel 3 located within the fingerprint recognition region 11 is in a first light emission mode. At this time, all sub-pixels 3 located within the display area 1 are in a same light emission mode, that is, all sub-pixels 3 intermittently emit light in the second period T2. This can reduce light emission brightness under a premise of normal image displaying, thereby reducing power consumption. In the fingerprint recognition mode, the second processing circuit 42 provides a second light emission control signal Emit2 to the pixel circuit 31 of the sub-pixel 3 located within the fingerprint recognition region 11, so that the sub-pixel 3 located within the fingerprint recognition region 11 is in a second light emission mode. In the second light emission mode, the sub-pixels 3 continuously emit light and the light emission duration is long. Therefore, light emission brightness of the sub-pixels 3 in the second light emission mode is higher than that of the sub-pixels 3 in the first light emission mode, thereby improving the detection accuracy of fingerprint recognition. At the same time, the sub-pixels 3 located within the non-fingerprint recognition region 12 are still in the first light emission mode, and thus the image displayed within the non-fingerprint recognition region 12 does not change in brightness.

It can be seen that, with the display panel provided by this embodiment of the present disclosure, when switching between the non-fingerprint recognition mode and the fingerprint recognition mode, only the light emission brightness of the sub-pixels 3 located within the fingerprint recognition region 11 is adjusted while the light emission brightness of the sub-pixels 3 located within the non-fingerprint recognition region 12 remains unchanged. This can improve the brightness continuity of the display image and reduce the brightness difference of the overall display image, thereby improving the user experience, while reducing power consumption and improving the detection accuracy of fingerprint recognition.

Figure 3:
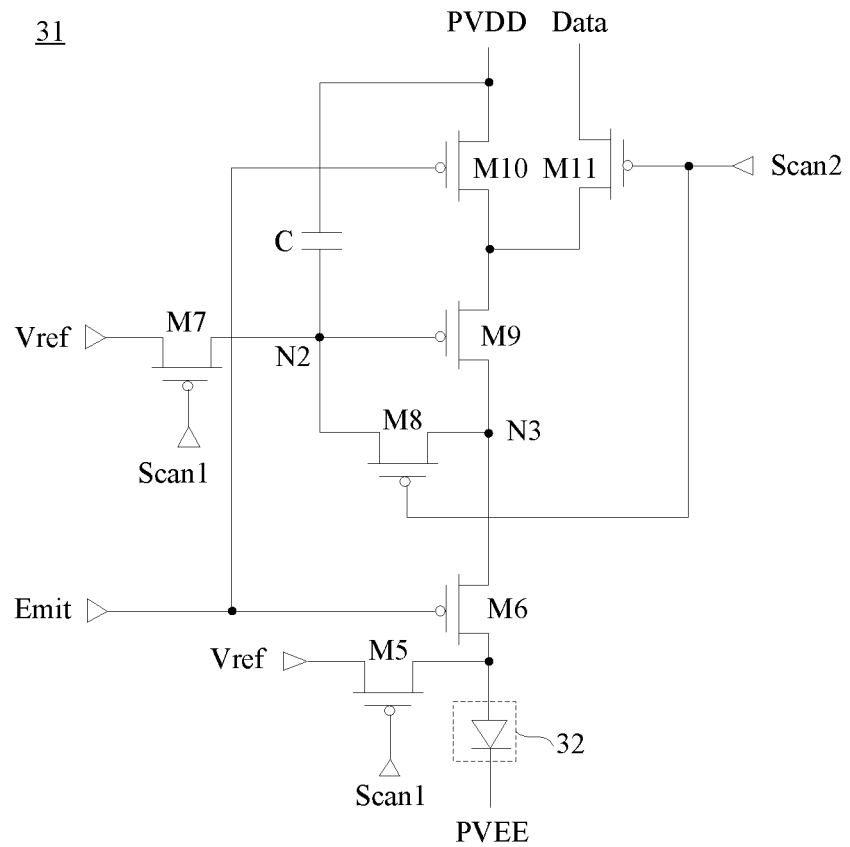
FIG. 3 is a schematic structural diagram of a pixel circuit according to an embodiment of the present disclosure.

For better illustrating the first period T1, the second period T2, the first sub-period t1 and the second sub-period t2 as mentioned above, the operating principle of the pixel circuit 31 will be illustrated by taking the pixel circuit 31 shown in FIG. 3 as an example.

As shown in FIG. 3, which is a schematic structural diagram of a pixel circuit according to an embodiment of the present disclosure, the pixel circuit 31 includes a storage capacitor C, and a fifth transistor T5 to an eleventh transistor T11. The first period T1 is a preparation period, including an initialization period and a data writing period. The second period T2 is a light emission control period, including a plurality of first sub-periods t1 and a plurality of second sub-periods t2.

Figure 4:
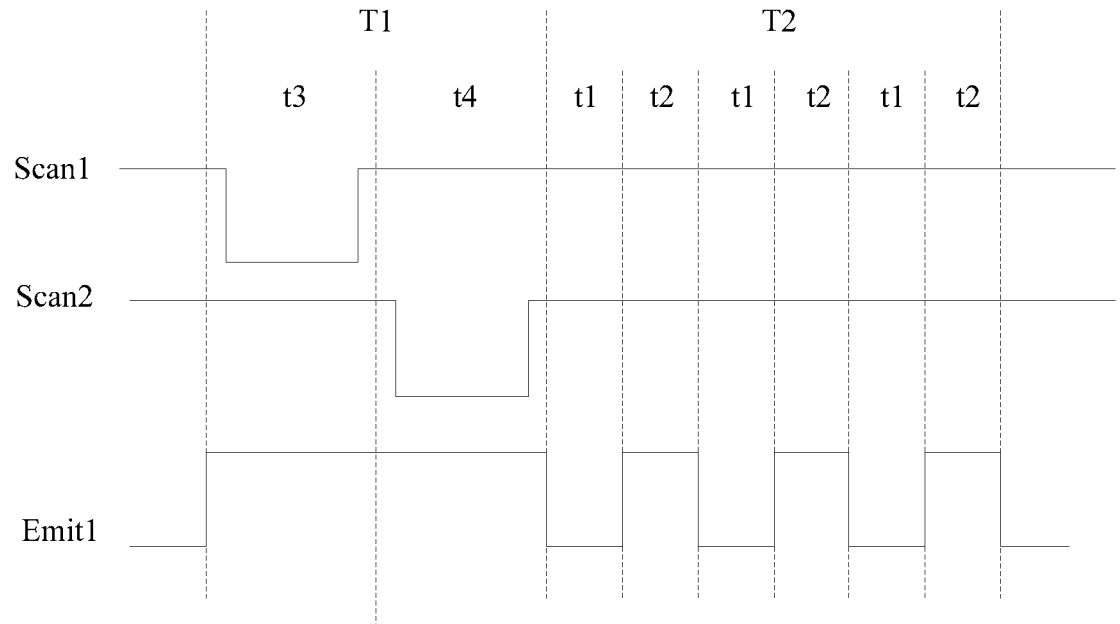
FIG. 4 is a signal sequence diagram of the pixel circuit shown in FIG. 3.

Taking the fingerprint recognition mode as an example, as shown in FIG. 4, which is a signal sequence diagram of the pixel circuit shown in FIG. 3, for the pixel circuit 31 located within the non-fingerprint recognition region 12, in the initialization period t3 of the first period T1, a first gate scan signal Scan1 is at a low level, a second gate scan signal Scan2 is at a high level, a first light emission control signal Emit1 is at a high level (a non-enabling level), the fifth transistor T5 and the seventh transistor T7 are switched on, and a second node N2 and an anode of the light-emitting element 32 are reset by an initialization potential signal Vref.

In the data writing period t4 of the first period T1, the first gate scan signal Scan1 is at a high level, the second gate scan signal Scan2 is at a low level, the first light emission control signal Emit1 is at a high level (a non-enabling level), the eighth transistor T8, the ninth transistor T9 and the eleventh transistor T11 are switched on, and a data signal Data is written into a third node N3.

In the first sub-period t1 of the second period T2, the first gate scan signal Scan1 is at a high level, the second gate scan signal Scan2 is at a high level, the first light emission control signal Emit1 is at a low level (an enabling level), the ninth transistor T9, the tenth transistor T10 and the sixth transistor T6 are switched on, and the light-emitting element 32 is caused to emit light under control of a driving current converted by the data signal Data and a power signal PVDD.

In the second sub-period t2 of the second period T2, the first gate scan signal Scan1 is at a high level, the second gate scan signal Scan2 is at a high level, the first light emission control signal Emit1 is at a high level (a non-enabling level), the sixth transistor T6 is not switched on, and the light-emitting element 32 does not emit light.

Based on the level states of the first light emission control signal Emit1 in the first sub-period t1 and in the second sub-period t2, the light-emitting element 32 is caused to emit light in the first sub-period t1 and to not emit light in the second sub-period t2. At this time, the sub-pixels 3 located within the non-fingerprint recognition region 12 intermittently emit light in the second period T2, and such light emission state is hereinafter referred to as a first light emission mode.

Figure 5:
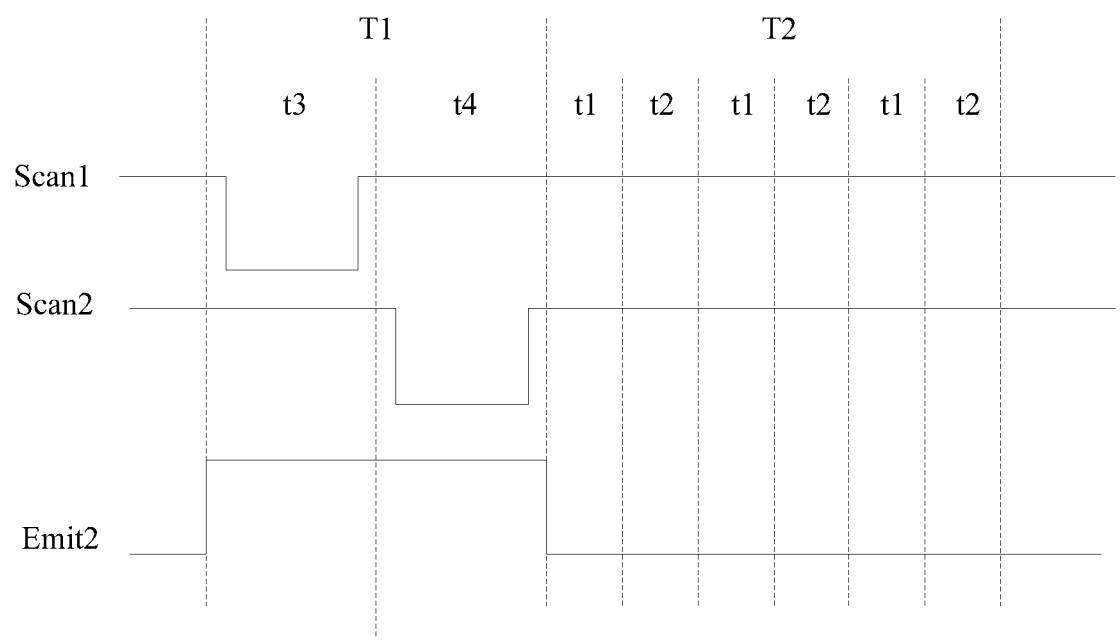
FIG. 5 is another signal sequence diagram of the pixel circuit shown in FIG. 3.

As shown in FIG. 5, which is another signal sequence diagram of the pixel circuit shown in FIG. 3, for the pixel circuit 31 located within the fingerprint recognition region 11, in the initialization period t3 and the data writing period t4 of the first period T1, level states of the first gate scan signal Scan1, the second gate scan signal Scan2 and the second light emission control signal Emit2 are the same as those the level states of the first gate scan signal Scan1, the second gate scan signal Scan2 and the first light emission control signal Emit1 as mentioned above, respectively, and will not be further described herein.

In the first sub-period t1 and the second sub-period t2 of the second period T2, the first gate scan signal Scan1 is at a high level, the second gate scan signal Scan2 is at a high level, the second light emission control signal Emit2 is at a low level (an enabling level), the ninth transistor T9, the tenth transistor T10, and the sixth transistor T6 are switched on, and the light-emitting element 32 emits light under control of a data signal Data.

Based on the level states of the second light emission control signal Emit2 in the first sub-period t1 and in the second sub-period t2, the light-emitting element 32 emits light both in the first sub-period t1 and in the second sub-period t2. At this time, the sub-pixels 3 located within the fingerprint recognition region 11 continuously emit light in the second period T2, and such light emission state is hereinafter referred to as a second light emission mode.

It should be noted that when the display panel is in the fingerprint recognition mode, light emitted by the sub-pixels 3 located within the non-fingerprint recognition region 12 is only used for normal display without being used for fingerprint recognition. Since the requirement for the light emission brightness of the sub-pixels 3 during the normal display is relatively low, the sub-pixels 3 located within the non-fingerprint recognition region 12 can be set to be in the first light emission mode and intermittently emit light in the second period T2. By shortening the light emission duration of the sub-pixels 3 in the second period T2, the light emission brightness of the sub-pixels 3 can be reduced. In addition, light emitted by the sub-pixels 3 located within the fingerprint recognition region 11 is used for both normal display and fingerprint recognition. Since the requirement for the light emission brightness of the sub-pixels 3 during the fingerprint recognition is relatively high, the sub-pixels 3 located within fingerprint recognition region 11 can be set to be in the second light emission mode and continuously emit light in the second period T2. At this time, the sub-pixels 3 located within fingerprint recognition region 11 are in a normal light emission mode, and compared with the first light emission mode, the sub-pixels 3 located within fingerprint recognition region 11 have a longer duration in the second period T2, thereby increasing the light emission brightness.

In addition, it should be noted that a plurality of cascaded scan control circuits may be arranged in the non-display area 2 of the display panel, and the plurality of scan control circuits sequentially outputs a scan signal. One row of sub-pixels 3 located within the display area 1 corresponds to a respective one scan control circuit. Further, the pixel circuits 31 of an $x^{th}$ row of sub-pixels 3 are electrically connected to both the scan control circuit corresponding to an $(x-1)^{th}$ row of sub-pixels 3 and the scan control circuit corresponding to the $x^{th}$ row of sub-pixels 3. The pixel circuits 31 of the $x^{th}$ row of sub-pixels 3 receive a first gate scan signal Scan1 and a second gate scan signal Scan 2, the first gate scan signal Scan1 is a scan signal outputted by the scan control circuit corresponding to the $(x-1)^{th}$ row of sub-pixels 3, and the second gate scan signal Scan2 is a scan signal outputted by the scan control circuit corresponding to the $x^{th}$ row of sub-pixels 3.

In an embodiment, the display panel is an organic light-emitting display panel. The display panel further includes a light sensation fingerprint recognition unit corresponding to the fingerprint recognition region 11. In the fingerprint recognition mode, the light-emitting elements 32 of the sub-pixels 3 located within the fingerprint recognition region 11 are reused as a light source for fingerprint recognition. In this way, there is no need for an external light source. This can reduce the process complexity is reduced and avoid thickness increase of the device due to the external light source.

In an embodiment, the light sensation fingerprint recognition unit includes a photodiode and a recognition unit. During the fingerprint recognition process, light emitted by the light-emitting elements 32 of the sub-pixels 3 located within the fingerprint recognition region 11 is reflected by a touch body (such as a finger) and reaches the photodiode. Since the fingerprint have ridges and valleys that have different distances to the light sensation fingerprint recognition unit, a brightness of the reflected light formed at a position of a ridge received by the photodiode is different from a brightness of the reflected light formed at a position of a valley received by the photodiode, and thus the converted photocurrents have different values. The recognition unit in turn identifies the fingerprint according to the values of the converted photocurrents.

In an embodiment, with reference to FIG. 1 again, each control unit 4 can include one first processing circuit 41 and one second processing circuit 42. In the fingerprint recognition region 11, the pixel circuits 31 of a same row of sub-pixels 3 are electrically connected to the first processing circuit 41 and the second processing circuit 42 of the corresponding control unit 4.

For example, a same row of pixel circuits 31 located within the fingerprint recognition region 11 can be electrically connected to only one first processing circuit 41 and one second processing circuit 42. In this way, the required number of first processing circuits 41 and second processing circuits 42 can be reduced, which can reduce the process complexity and the space occupied by the first processing circuit 41 and the second processing circuit 42 in the display panel.

Figure 6:
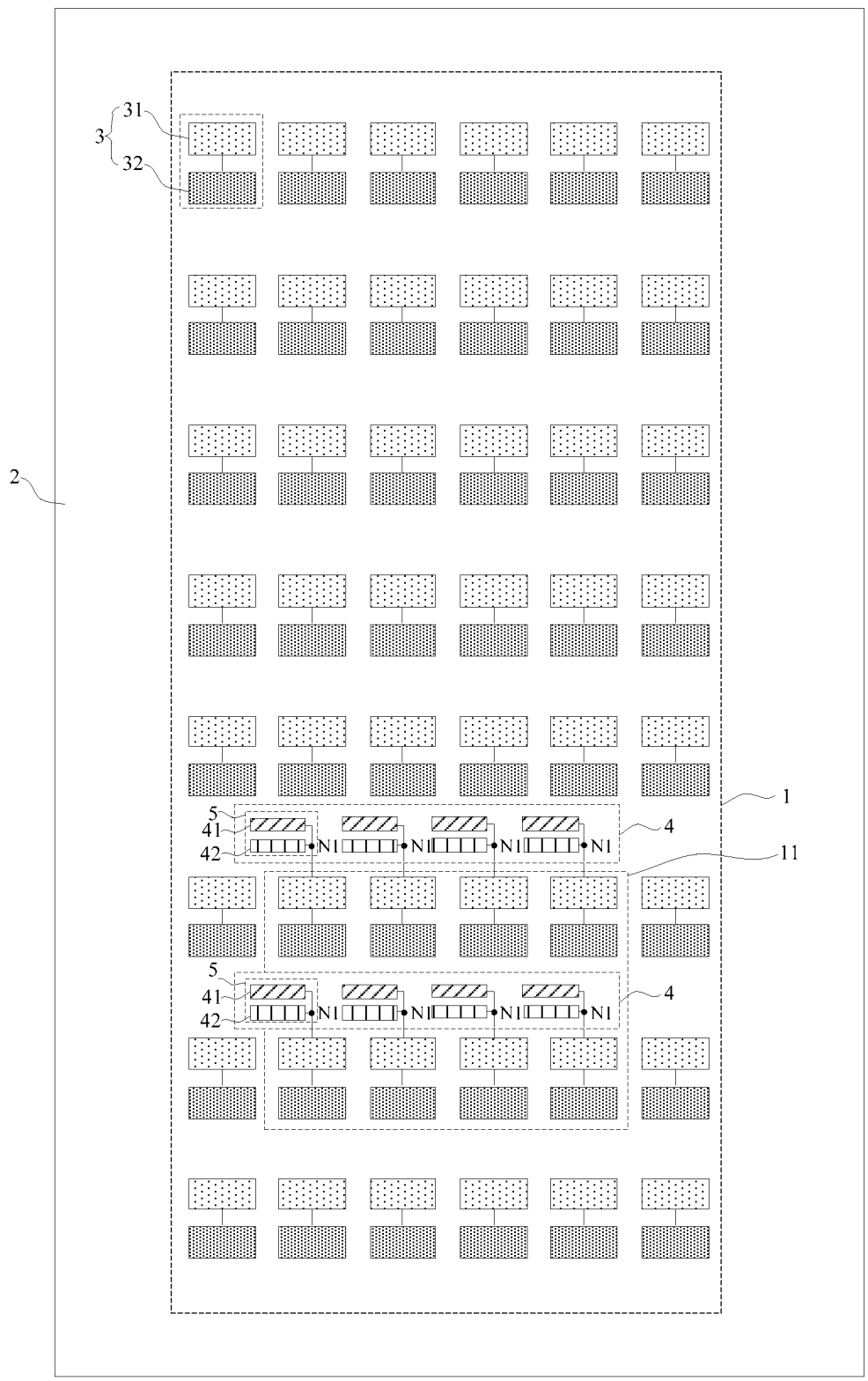
FIG. 6 is a schematic structural diagram of another display panel according to an embodiment of the present disclosure.

In an embodiment, as shown in FIG. 6, which is a schematic structural diagram of another display panel according to an embodiment of the present disclosure, in the fingerprint recognition region 11, a row of sub-pixels 3 include M sub-pixels 3, and each control unit 4 includes M control sub-units 5, each of which includes one first processing circuit 41 and one second processing circuit 42, where M is a positive integer. In the fingerprint recognition region 11, one control sub-unit 5 corresponds to one sub-pixel 3 within the fingerprint recognition region 11, and the pixel circuit 31 of each sub-pixel 3 is electrically connected to the first processing circuit 41 and the second processing circuit 42 of the corresponding control sub-unit 5.

The pixel circuit 31 of each sub-pixel 3 located within the fingerprint recognition region 11 is electrically connected to a first processing circuit 41 and a second processing circuit 42 of a respective one control sub-unit 5, such that the light emission state of each sub-pixel 3 located within the fingerprint recognition region 11 can be individually controlled. In this way, on the one hand, the light emission state of the sub-pixel 3 located within the fingerprint recognition region 11 can be more precisely controlled, and on the other hand, when one or several of the first processing circuits 41 and the second processing circuits 42 could not work properly, the influence on the overall light emission brightness of the sub-pixels 3 in the fingerprint recognition region 11 can be reduced.

In an embodiment, the first processing circuit 41 and the second processing circuit 42 of the control unit 4 may be arranged within the non-display area 2 or within the display area 1. When the control unit 4 is arranged within the non-display area 2, with reference to FIG. 1 again, the control unit 4 and the metal traces for connecting the control unit 4 and the pixel circuits 31 can be prevented from shielding the aperture area of the sub-pixels 3 and thus the aperture ratio of sub-pixels 3 can be reduced. When the control unit 4 is arranged within the display area 1, with reference to FIG. 6 again, the control unit 4 can be prevented from occupying space in the non-display area 2. As a result, a narrow border design can be achieved.

It should be noted that when the pixel circuits 31 of a same row of sub-pixels 3 in the fingerprint recognition region 11 are electrically connected to one first processing circuit 41 and one second processing circuit 42 as shown in FIG. 1, it is only a schematic example that the first processing circuit 41 and the second processing circuit 42 are located within the non-display area 2, which is not a limitation on positions of the first processing circuit 41 and the second processing circuit 42. In this case, in another example, the first processing circuit 41 and the second processing circuit 42 may also be located within the display area 1. The same applies to FIG. 6, and will not be further described herein.

Figure 7:
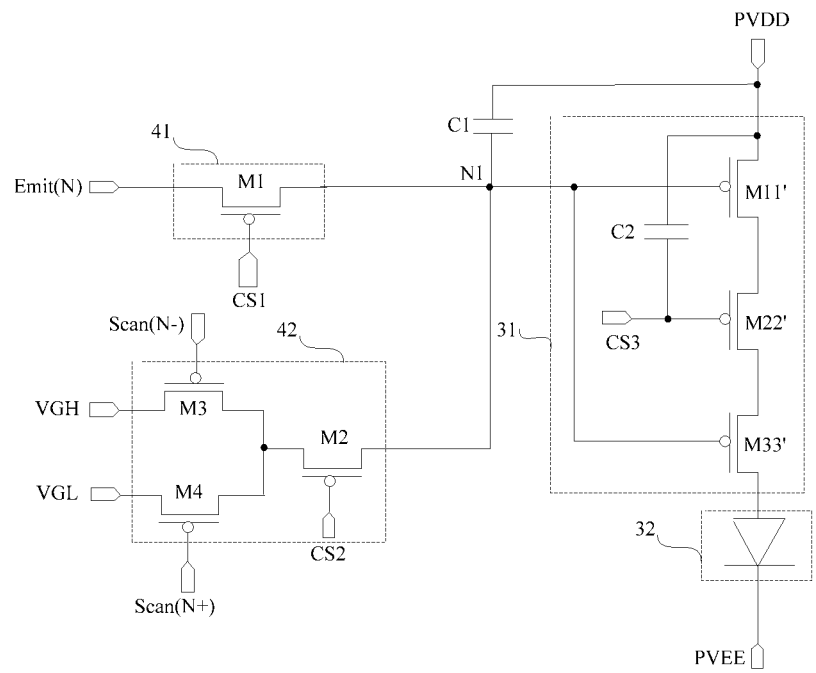
FIG. 7 is a schematic structural diagram of a first processing circuit and a second processing circuit according to an embodiment of the present disclosure.

In an embodiment, as shown in FIG. 7, which is a schematic structural diagram of a first processing circuit and a second processing circuit according to an embodiment of the present disclosure, the first processing circuit 41 includes a first transistor M1. The first transistor M1 has a control electrode electrically connected to a first control signal terminal CS1, a first electrode electrically connected to a light emission control signal terminal Emit(N) for providing a first light emission control signal Emit1, and a second electrode electrically connected to a first node N1. In the non-fingerprint recognition mode, the first transistor M1 is switched on by an enabling level provided by the first control signal terminal CS1, and the first light emission control signal Emit1 provided by the light emission control signal terminal Emit(N) is transmitted to the first node N1 through the switched-on the transistor M1, so that under control of the first light emission control signal Emit1, the corresponding pixel circuit 31 controls the light-emitting element 32 to emit light in the first light emission mode.

Figure 8:
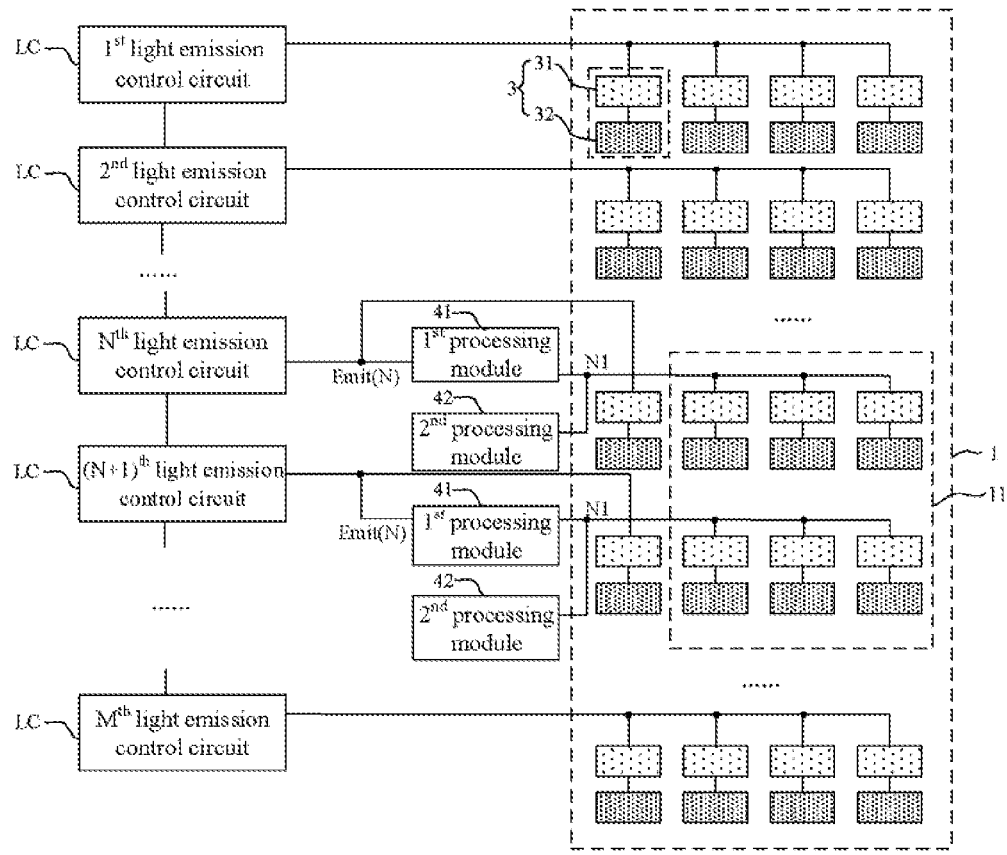
FIG. 8 is a schematic diagram of connection between light emission control circuits and first processing circuits according to an embodiment of the present disclosure.

Further, as shown in FIG. 8, which is a schematic diagram of connection between light emission control circuits and first processing circuits according to an embodiment of the present disclosure, a plurality of cascaded light emission control circuits LC is provided in the non-display area 2, and each row of sub-pixels 3 located within the display area 1 corresponds to one light emission control circuit LC, that is, each row of sub-pixels 3 located within the fingerprint recognition region 11 corresponds to one light emission control circuit LC. For the pixel circuit 31 of a sub-pixel 3 in the fingerprint recognition region 11, its corresponding light emission control signal terminal Emit(N) is further electrically connected to an output terminal of the light emission control circuit LC corresponding to the row of sub-pixels where this pixel circuit 31 belongs to.

In combination with FIG. 7 and FIG. 8, M rows of sub-pixels 3 are provided in the display area 1, and M cascaded light emission control circuits LC are provided in the non-display area 2. One row of sub-pixels 3 corresponds to one light emission control circuit LC, and the M cascaded light emission control circuits LC sequentially output a first light emission control signal Emit1.

In the fingerprint recognition region 11, the light emission control terminal corresponding to the pixel circuits 31 of an $N^{th}$ row of sub-pixels 3 is electrically connected to the output terminal of the light emission control circuit LC corresponding to the $N^{th}$ row of sub-pixels 3. During the fingerprint recognition process, the first light emission control signal Emit1 outputted by this light emission control circuit LC is transmitted to the first node N1 through the switched-on first transistor M1, so that the corresponding sub-pixel 3 emits light.

It should be noted that the abovementioned $N^{th}$ in "the $N^{th}$ row of sub-pixels 3" refers to the row number of this row of sub-pixels 3 in the entire display area 1, other than the row number of this row of sub-pixels 3 in the fingerprint recognition region 11.

If a certain row of sub-pixels 3 includes some sub-pixels 3 located within the fingerprint recognition region 11 and some sub-pixels 3 located within the non-fingerprint recognition region, the pixel circuit 31 of each sub-pixel 3 located within the fingerprint recognition region 11 is electrically connected to the output terminal of the light emission control circuit LC corresponding to this row through the first processing circuit 41, and each sub-pixel 3 located within the non-fingerprint recognition region 12 is directly electrically connected to the output terminal of the light emission control circuit LC.

In addition, it should be noted that it is only a schematic example in FIG. 8 that the sub-pixels 3 is unilaterally driven by the light emission control circuit LC, that is, the M cascaded light emission control circuits LC are located at one side of the non-display area 2. In this case, a $1^{st}$ row of sub-pixels 3 corresponds to a $1^{st}$ light emission control circuit LC, a $2^{nd}$ row of sub-pixels 3 corresponds to a second light emission control circuit LC, . . . , an $M^{th}$ row of sub-pixels 3 corresponds to an $M^{th}$ light emission control circuit LC. For the sub-pixels 3 of the $N^{th}$ row of sub-pixels 3 located within the fingerprint recognition region 11, the light emission control signal terminal Emit(N) corresponding to the pixel circuits 31 of those sub-pixels 3 is electrically connected to the output terminal of the $N^{th}$ light emission control circuit LC. However, it should be understood that even if the light emission control circuit LC performs bilateral driving or cross driving on the sub-pixels 3, for the sub-pixels 3 of the $N^{th}$ row of sub-pixels 3 located within the fingerprint recognition region 11, the light emission control signal terminal Emit(N) corresponding to the pixel circuits 31 of those sub-pixels 3 is also electrically connected to the output terminal of the light emission control circuit LC corresponding to the $N^{th}$ row of sub-pixels 3.

It should be understood that, for two adjacent light emission control circuits LC that are cascaded, a shift control signal received by one light emission control circuit LC can be provided by a shift control terminal of its previous light emission control circuit LC. With reference to FIG. 8, the input terminal of one light emission control circuit LC is electrically connected to the shift control terminal of its previous light emission control circuit LC. In another embodiment, the shift control signal received by the input terminal of the one light emission control circuit LC is provided by the output terminal of its previous light emission control circuit LC. In this case, the input terminal of one light emission control circuit LC is electrically connected to the output terminal of its previous light emission control circuit LC. The cascading manner between two adjacent light emission control circuits LC can be determined based on internal structures of the light emission control circuits LC, and will not be limited by the embodiments of the present disclosure.

In an embodiment, with further reference to FIG. 7, the second processing circuit 42 includes a second transistor M2. The second transistor M2 has a control electrode electrically connected to a second control signal terminal CS2, a second electrode electrically connected to the first node N1, and a first electrode that is used to receive a second light emission control signal Emit2. In the fingerprint recognition mode, the second transistor M2 is switched on by an enabling level provided by the second control signal terminal CS2, and the second light emission control signal Emit2 is transmitted to the first node N1 through the switched-on second transistor M2, so that the corresponding pixel circuit 31 controls, under control of the second light emission control signal Emit2, the light-emitting element 32 to emit light in the second light emission mode.

In an embodiment, with further reference to FIG. 7, the second processing circuit 42 further includes a third transistor M3 and a fourth transistor M4.

The third transistor M3 has a control electrode electrically connected to a first scan signal terminal Scan(N−), a first electrode electrically connected to a first voltage signal terminal VGH, and a second electrode connected to the first electrode of the second transistor M2. In the fingerprint recognition mode, in the first period T1, the third transistor M3 is switched on by an enabling level at the first scan signal terminal Scan(N−), and a non-enabling level at the first voltage signal terminal VGH is transmitted to the first electrode of the second transistor M2 through the switched-on third transistor M3.

The fourth transistor M4 has a control electrode electrically connected to a second scan signal terminal Scan(N+), a first electrode electrically connected to a second voltage signal terminal VGL, and a second electrode electrically connected to the first electrode of the second transistor M2. In the fingerprint recognition mode, in the second period T2, the fourth transistor M4 is switched on by an enabling level at the second scan signal terminal Scan(N+), and an enabling level at the second voltage signal terminal VGL is transmitted to the first electrode of the second transistor M2 through the switched-on fourth transistor M4.

Figure 9:
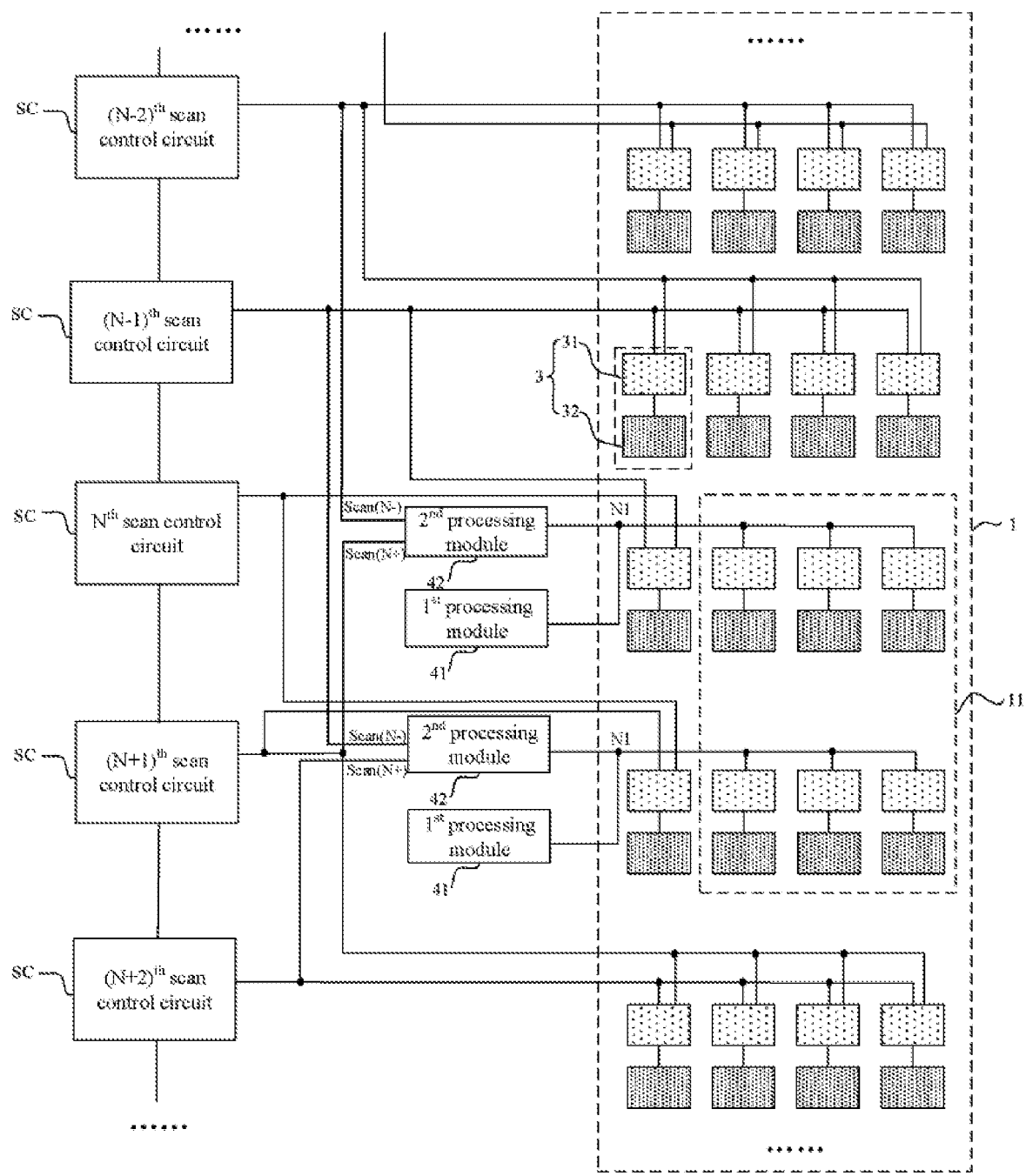
FIG. 9 is a schematic diagram of connection between light emission control circuits and second processing circuits according to an embodiment of the present disclosure.

In combination with FIG. 7 and FIG. 9, as shown in FIG. 9, which is a schematic diagram of connection between light emission control circuits and second processing circuits according to an embodiment of the present disclosure, M rows of sub-pixels 3 are provided in the display area 1, and M cascaded scan control circuits SC are provided in the non-display area 2. The M cascaded scan control circuits SC sequentially output a scan signal, and one row of sub-pixels 3 corresponds to one scan control circuit SC, that is, one row of sub-pixels 3 located within the fingerprint recognition region 11 corresponds to one scan control circuit SC. In the fingerprint recognition region 11, the first scan signal terminal Scan(N−) corresponding to sub-pixels 3 in the $N^{th}$ row is further electrically connected to the output terminal of the scan control circuit SC corresponding to the $(N−m)^{th}$ row of sub-pixel 3, and the second scan signal terminal Scan(N+) corresponding to sub-pixels 3 in the $N^{th}$ row is further electrically connected to the output terminal of the scan control circuit SC corresponding to the $(N+n)^{th}$ row of sub-pixels 3. Here, m is an integer larger than or equal to 0, and n is a positive integer.

It should be noted that, if a part of sub-pixels 3 in the $N^{th}$ row of sub-pixels 3 are located within the fingerprint recognition region 11 and the other part of sub-pixels 3 in this row are located within the non-fingerprint recognition region, the pixel circuits 31 of the sub-pixels 3 in the $N^{th}$ row within the fingerprint recognition region 11 are electrically connected to the scan control circuit SC corresponding to the $N^{th}$ row of sub-pixels and the scan control circuit SC corresponding to the $(N−1)^{th}$ row of sub-pixels, and are further electrically connected to the scan control circuit SC corresponding to the $(N−m)^{th}$ row of sub-pixels and the scan control circuit SC corresponding to the $(N+n)^{th}$ row of sub-pixels. The pixel circuits 31 of the sub-pixels 3 in the $N^{th}$ row within the non-fingerprint recognition region 12 are electrically only connected to the scan control circuit SC corresponding to the $N^{th}$ row of sub-pixels and the scan control circuit SC corresponding to the $(N−1)^{th}$ row of sub-pixels. Here, for the related principle of electrically connecting the pixel circuits 31 of the sub-pixels 3 to the scan control circuit SC corresponding to the $N^{th}$ row of sub-pixels 3 and the scan control circuit SC corresponding to the $(N−1)^{th}$ row of sub-pixels 3, please refer to the above description with respect to the operating principle of the pixel circuits 31 as shown in FIG. 3.

In addition, it should be noted that it is only a schematic example in FIG. 9 that the sub-pixels 3 is unilaterally driven by the scan control circuit SC, that is, the M cascaded scan control circuits SC are located at one side of the non-display area 2. In this case, a $1^{st}$ row of sub-pixels 3 correspond to a $1^{st}$ scan control circuit SC, a $2^{nd}$ row of sub-pixels 3 correspond to a second scan control circuit SC, . . . , and an $M^{th}$ row of sub-pixels 3 correspond to an $M^{th}$ scan control circuit SC. For the sub-pixels 3 in the $N^{th}$ row of sub-pixels 3 located within the fingerprint recognition region 11, the first scan signal terminal Scan(N−) corresponding to the pixel circuits 31 of the sub-pixels 3 is electrically connected to the output terminal of the $(N−m)^{th}$ scan control circuit SC, and the second scan signal terminal Scan(N+) corresponding to the pixel circuits 31 of the sub-pixels 3 is electrically connected to the output terminal of the $(N+n)^{th}$ scan control circuit SC. However, it should be understood that even if the scan control circuit SC performs bilateral driving or cross driving on the sub-pixels 3, for the sub-pixels 3 in the $N^{th}$ row of sub-pixels 3 located within the fingerprint recognition region 11, the first scan signal terminal Scan(N−) and the second scan signal terminal Scan(N+) corresponding to the pixel circuits 31 of the sub-pixels 3 are also electrically connected to the output terminals of the scan control circuits SC corresponding to the $(N-m)^{th}$ row of sub-pixels 3 and the $(N+n)^{th}$ row of sub-pixels 3.

It should be understood that, for two adjacent scan control circuits SC that are cascaded, a shift control signal received by one scan control circuit SC can be provided by a shift control terminal of its previous scan control circuit SC. With further reference to FIG. 9, the input terminal of one scan control circuit SC is electrically connected to the shift control terminal of its previous scan control circuit SC. In another embodiment, the shift control signal received by the input terminal of one scan control circuit SC is provided by the output terminal of its previous scan control circuit SC. In this case, the input terminal of one scan control circuit SC is electrically connected to the output terminal of its previous scan control circuit SC. The cascading manner between two adjacent scan control circuits SC can be determined according to internal structures of the scan control circuits SC, which will not be limited by the embodiments of the present disclosure.

In addition, it should be noted that if N=1, m cascaded scan control circuits SC can be additionally provided, followed by the scan control circuit SC corresponding to the $1^{st}$ row of sub-pixels 3; and if N=M, n cascaded additional scan control circuits SC can be additionally provided, following the scan control circuit SC corresponding to the $M^{th}$ row of sub-pixels 3. Moreover, the additionally provided scan control circuits SC have the same cascading mode and structure as those of other scan control circuits SC.

In combination with FIG. 7-FIG. 9, the driving process on the $N^{th}$ row of sub-pixels 3 located within the fingerprint recognition region 11 will be described in details as follows by taking an example that both the light emission control circuits LC and the scan control circuits SC unilaterally drive the sub-pixels 3 and that m=2 and n=1.

In the non-fingerprint recognition mode, light emission control circuits LC sequentially output a first light emission control signal Emit1. When the $N^{th}$ light emission control circuit LC outputs a first light emission control signal Emit1, the first light emission control signal Emit1 is transmitted to the first node N1 through the switched-on first transistor M1, so that the pixel circuits 31 of the $N^{th}$ row of sub-pixels 3 located within the fingerprint recognition region 11 drive the light-emitting elements 32 to emit light in the first light emission mode under control of the first light emission control signal Emit1.

Figure 10:
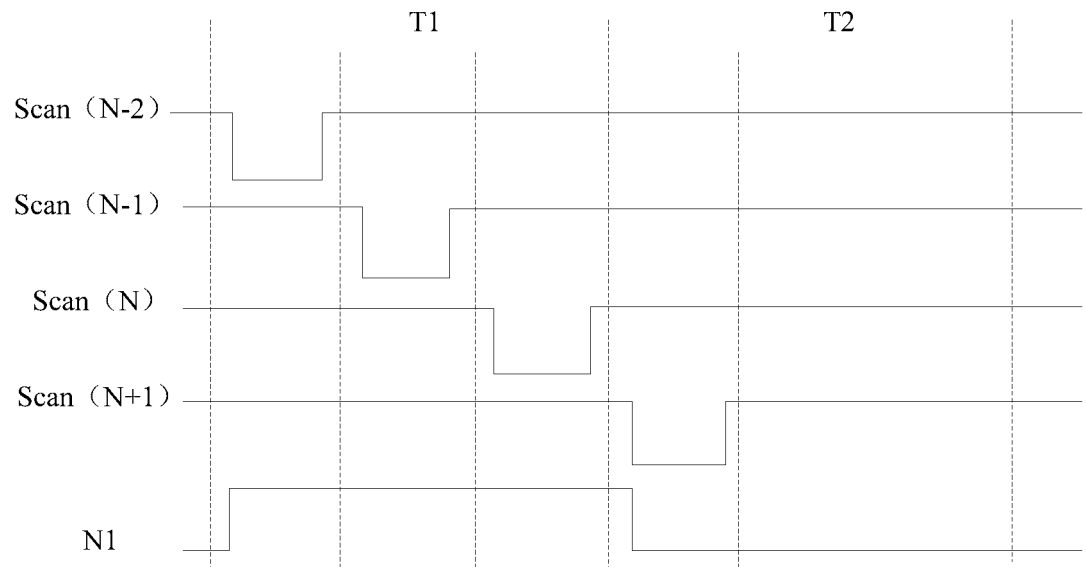
FIG. 10 is a signal sequence diagram of scan signals and a second light emission control signal according to an embodiment of the present disclosure.

In the fingerprint recognition mode, as shown in FIG. 10, which is a signal sequence diagram of scan signals and a second light emission control signal according to an embodiment of the present disclosure, the second transistor M2 is switched on under control of an enabling level provided by the second control signal terminal CS2, and a plurality of scan control circuits SC sequentially output a scan signal. When the $(N-2)^{th}$ scan control circuit SC outputs a first scan signal Scan(N−2), the third transistor M3 is switched on under control of an enabling level of the first scan signal Scan(N−2). A non-enabling level provided by the first voltage signal terminal VGH is transmitted to the first node N1 through the switched-on third transistor M3 and second transistor M2, so that the signal at the first node N1 is maintained at a non-enabling level. This duration is referred as a first period T1 of the driving cycle.

When the $(N+1)^{th}$ scan control circuit SC outputs a second scan signal Scan(N+1), the fourth transistor M4 is switched on under control of an enabling level of the second scan signal Scan(N+1). An enabling level provided by the second voltage signal terminal VGL is transmitted to the first node N1 through the switched-on fourth transistor M4 and second transistor M2, so that the signal at the first node N1 is maintained at an enabling level. This duration is referred as a second period T2 of the driving cycle, during which the sub-pixels 3 located within the fingerprint recognition region 11 emit light in the second light emission mode.

Figure 11:
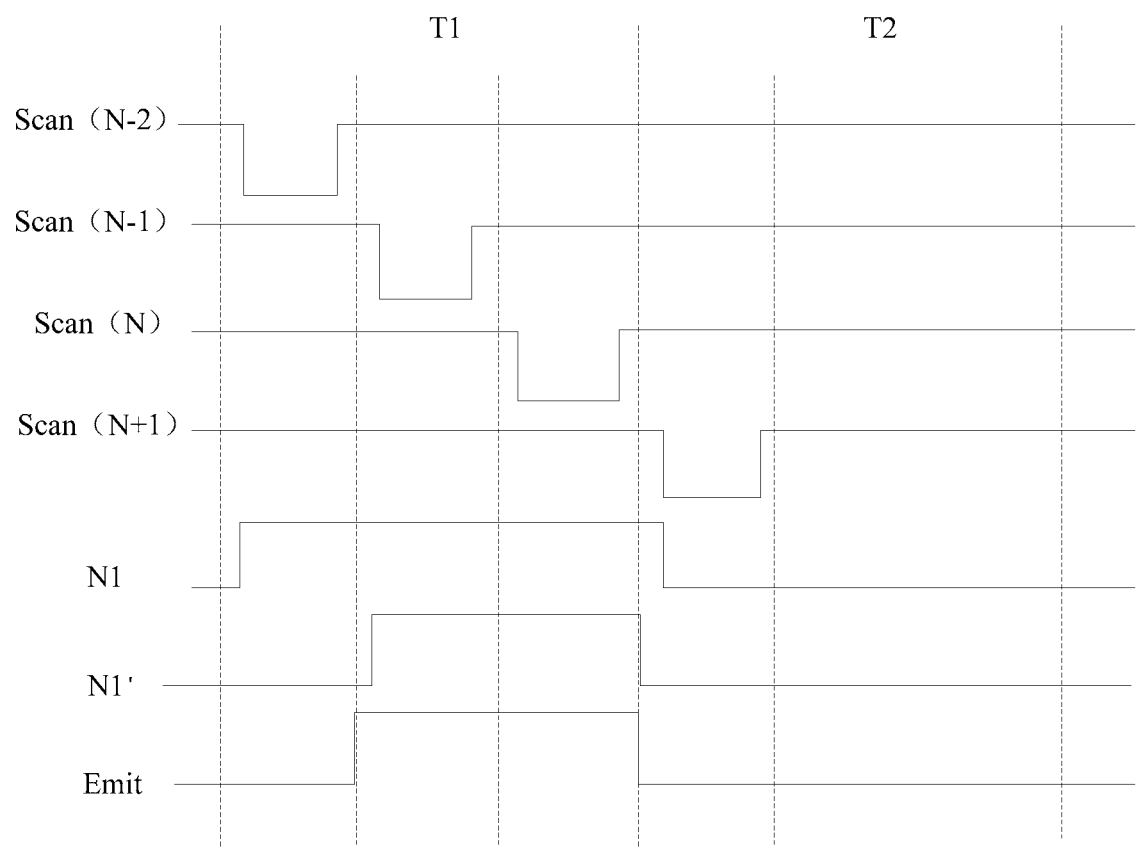
FIG. 11 is a schematic comparison diagram of signals of a first node according to an embodiment of the present disclosure.

It should be noted that for two adjacent scan control circuits SC (for example, the $(N-1)^{th}$ scan control circuit SC and the $N^{th}$ scan control circuit SC), in order to prevent both the scan signal Scan(N−1) and the scan signal ScanN from being at a low level at the same moment due to the scan signal Scan(N−1) being pulled high too late, a certain time interval usually exists between pulling high of the scan signal Scan(N−1) and pulling low of the scan signal ScanN. Based on this, as shown in FIG. 11, which is a schematic comparison diagram of signals of a first node according to an embodiment of the present disclosure, if m=1, when the $(N-1)^{th}$ scan control circuit SC outputs a low level, a non-enabling level provided by the first voltage signal terminal VGH is transmitted to the first node N1, and then the duration during which the signal (indicated by N1' in FIG. 11) of the first node N1 is maintained at a non-enabling level is shorter than the duration of a non-enabling level of a normal light emission control signal (indicated by Emit in FIG. 11), which keeps the sub-pixels 3 in the second light emission mode. This would result in that the data signal is written insufficiently, and thus the corresponding sub-pixel 3 has low light emission brightness. Therefore, it taken that m=2, which, on the one hand, can maintain the signal of the first node N1 at the non-enabling level long enough and thus achieve sufficient data signal writing, and on the other hand, can prevent the signal of the first node N1 from being maintained at the non-enabling level too long.

Further, it is taken that n=1, when the $(N+1)^{th}$ scan control circuit SC outputs a scan signal of a low-level, the enabling level provided by the second voltage signal terminal VGL can be transmitted to the first node N1. Compared with the case in which n is another positive integer larger than 1, the signal at the first node N1 can be maintained at the enabling level for a longer time when n=1, so that light emission time of the sub-pixel 3 can be increased and thus the light emission brightness can further increased, thereby improving the detection accuracy of fingerprint recognition.

Moreover, when m=2 and n=1, the duration during which the second light emission control signal Emit2 is at the non-enabling level and the duration during which the second light emission control signal Emit2 is at the enabling level are closest to those of the normal light emission control signal Emit' when the sub-pixel 3 is in the second light emission mode. In this way, the sub-pixels 3 located within the fingerprint recognition region 11 can normally emit light in the second light emission mode.

With further reference to FIG. 7, the display panel can further include a first capacitor C1. The first capacitor C1 has a first electrode electrically connected to a fixed voltage signal terminal, and a second electrode electrically connected to the first node N1. In an embodiment, the fixed voltage signal terminal is the power signal terminal PVDD.

When the display panel includes the first capacitor C1, since the first capacitor C1 is electrically connected to the fixed voltage signal terminal, the first capacitor C1 can stabilize the potential at the first node N1 by using the fixed potential signal, thereby preventing the potential at the first node N1 from abnormally floating. In this way, the sub-pixels 3 can further normally emit light.

With further reference to FIG. 7, the pixel circuit 31 can include a first control transistor M11', a driving transistor M22', a second control transistor M33', and a second capacitor C2.

The first control transistor M11' has a control electrode electrically connected to the first node N1, a first electrode electrically connected to the power signal terminal, and a second electrode. The driving transistor M22' has a control electrode electrically connected to a third control signal terminal CS3, a first electrode electrically connected to the second electrode of the first control transistor M11', and a second electrode. The second control transistor M33' has a control electrode electrically connected to the first node N1, a first electrode electrically connected to the second electrode of the driving transistor M22', and a second electrode electrically connected to the light-emitting element 32. The second capacitor C2 has a first electrode electrically connected to the power signal terminal, and a second electrode electrically connected to the third control signal terminal CS3.

Figure 12:
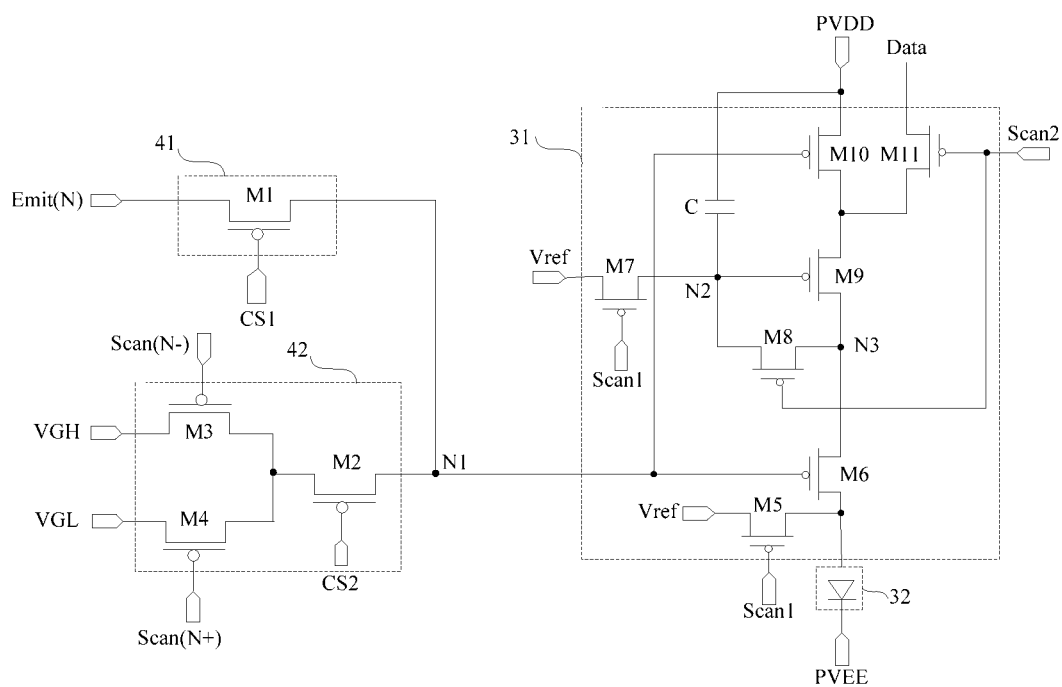
FIG. 12 is a schematic diagram illustrating a connection relationship of a first processing circuit, a second processing circuit, and a pixel circuit.

It should be noted that, in combination with FIG. 3, the first control transistor M11' in FIG. 7 corresponds to the tenth transistor M10 in FIG. 3, the driving transistor M22' in FIG. 7 corresponds to the ninth transistor M9 in FIG. 3, the second control transistor M33' in FIG. 7 corresponds to the sixth transistor M6 in FIG. 3, the second capacitor C2 in FIG. 7 corresponds to the storage capacitor C in FIG. 3, and the third control signal terminal CS3 in FIG. 7 corresponds to the second node N2 in FIG. 3. If the pixel circuit 31 is shown in FIG. 3, the connection relationship of the first processing circuit, the second processing circuit and the pixel circuit is shown in FIG. 12. However, in practical applications, there may be various structures for the pixel circuit 31, which is not limited to the circuit structure shown in FIG. 3. When the pixel circuit 31 has another structure, the pixel circuit 31 also includes a first control transistor M11', a driving transistor M22', a second control transistor M33', and a second capacitor C2.

An embodiment of the present disclosure further provides a method for driving a display panel, and the method is applied in the abovementioned display panel.

In combination with FIG. 1 and FIG. 2, the operating modes of the display panel include a non-fingerprint recognition mode and a fingerprint recognition mode. In both the non-fingerprint recognition mode and in the fingerprint recognition mode, a driving cycle of the pixel circuit 31 includes a first period T1 and a second period T2, and the second period T2 includes a plurality of first sub-periods t1 and a plurality of second sub-periods t2 that are alternate.

The method for driving the display panel includes the following steps.

In the non-fingerprint recognition mode, for each sub-pixel 3 located within the non-fingerprint recognition region 12, the pixel circuit 31 receives and responds to the first light emission control signal Emit1, in the first period T1 and in the second sub-period t2, the first light emission control signal Emit1 is at a non-enabling level, and the corresponding light-emitting element 32 does not emit light, and in the first sub-period t1, the first light emission control signal Emit1 is at an enabling level, and the corresponding light-emitting element 32 emits light. For each sub-pixel 3 located within the fingerprint recognition region 11, the first processing circuit 41 provides the first light emission control signal Emit1 to the first node N1, and the pixel circuit 31 responds to the first light emission control signal Emit1, in the first period T1 and in the second sub-period t2, the first light emission control signal Emit1 is at a non-enabling level, and the corresponding light-emitting element 32 does not emit light, and in the first sub-period t1, the first light emission control signal Emit1 is at an enabling level, and the corresponding light-emitting element 32 emits light.

In the fingerprint recognition mode, for each sub-pixel 3 located within the non-fingerprint recognition region 12, the pixel circuit 31 receives and responds to the first light emission control signal Emit1. In the first period T1 and in the second sub-period t2, the first light emission control signal Emit1 is at a non-enabling level, and the corresponding light-emitting element 32 does not emit light; and in the first sub-period t1, the first light emission control signal Emit1 is at an enabling level, and the corresponding light-emitting element 32 emits light. For each sub-pixel 3 located within the fingerprint recognition region 11, the second processing circuit 42 provides a second light emission control signal Emit2 to the first node N1, and the pixel circuit 31 responds to the second light emission control signal Emit2, in the first period T1, the second light emission control signal Emit2 is at a non-enabling level, and the corresponding light-emitting element 32 does not emit light, and in the first sub-period t1 and in the second sub-period t2, the second light emission control signal Emit2 is at an enabling level, and the corresponding light-emitting element 32 emits light.

With the abovementioned method for driving the display panel provided by an embodiment of the present disclosure, light emission states of the sub-pixels 3 located within the fingerprint recognition region 11 can be separately controlled. In the non-fingerprint recognition mode, the first processing circuit 41 provides a first light emission control signal Emit1 to the pixel circuits 31 of the sub-pixels 3 located within the fingerprint recognition region 11, so that the sub-pixels 3 located within the fingerprint recognition region 11 are in a first light emission mode. In the fingerprint recognition mode, the second processing circuit 42 provides a second light emission control signal Emit2 to the pixel circuits 31 of the sub-pixels 3 located within the fingerprint recognition region 11, so that the sub-pixels 3 located within the fingerprint recognition region 11 are in a second light emission mode. In the second light emission mode, the sub-pixels 3 continuously emit light in the second period T2, and the duration of light emission is long. This can increase light emission brightness of the sub-pixels 3, thereby improving the detection accuracy of fingerprint recognition. Moreover, in both the non-fingerprint recognition mode and the fingerprint recognition mode, the sub-pixels 3 located within the non-fingerprint recognition region 12 are in the first light emission mode, and thus the display image within the non-fingerprint recognition region 12 will have no change in brightness.

Therefore, with this method, when switching between the non-fingerprint recognition mode and the fingerprint recognition mode, only the light emission brightness of the sub-pixels 3 located within the fingerprint recognition region 11 is adjusted. This can reduce the brightness difference of the entire display image can be reduced and thus improve the user experience, while improving the detection accuracy of fingerprint recognition.

With further reference to FIG. 7 and FIG. 8, the first processing circuit 41 includes a first transistor M1. The first transistor M1 has a control electrode electrically connected to a first control signal terminal CS1, a first electrode electrically connected to a light emission control signal terminal Emit(N) for providing a first light emission control signal Emit1, and a second electrode electrically connected to a first node N1. A plurality of light emission control circuits LC that is cascaded is further provided in the non-display area 2, and one row of sub-pixels 3 located within the fingerprint recognition region 11 corresponds to one light emission control circuit LC. In the fingerprint recognition region 11, the light emission control signal terminal Emit(N) is electrically connected to an output terminal of the light emission control circuit LC.

Correspondingly, in the non-fingerprint recognition mode, the first processing circuit 41 provides the first light emission control signal Emit1 to the first node N1. This process can include the following steps.

In the non-fingerprint recognition mode, in the first period T1 and in the second sub-period t2, the first transistor M1 is switched on under control of an enabling level at the first control signal terminal CS1, and a non-enabling level outputted by the light emission control circuit LC corresponding to the first transistor M1 is transmitted to the first node N1 through the switched-on transistor M1. In the first sub-period t1, the first transistor M1 is switched on under control of an enabling level at the first control signal terminal CS1, and an enabling level outputted by the light emission control circuit LC corresponding to the first transistor M1 is transmitted to the first node N1 through the switched-on the transistor M1.

The abovementioned processes have been described in the above embodiments, and details thereof will not be further described herein.

With further reference to FIG. 7 and FIG. 9, the second processing circuit 42 includes a second transistor M2, a third transistor M3, and a fourth transistor M4. The second transistor M2 has a control electrode electrically connected to a second control signal terminal CS2, a first electrode, and a second electrode is electrically connected to the first node N1. The third transistor M3 has a control electrode is electrically connected to a first scan signal terminal Scan(N−), a first electrode is electrically connected to a first voltage signal terminal VGH, and a second electrode is connected to the first electrode of the second transistor M2. The fourth transistor M4 has a control electrode electrically connected to a second scan signal terminal Scan(N+), a first electrode electrically connected to a second voltage signal terminal VGL, and a second electrode electrically connected to the first electrode of the second transistor M2. A plurality of scan control circuits SC that is cascaded is further provided in the non-display area 2, and one row of sub-pixels 3 located within the fingerprint recognition region 11 corresponds to one scan control circuit SC. In the fingerprint recognition region 11, the first scan signal terminal Scan(N−) corresponding to the $N^{th}$ row of sub-pixels 3 is further electrically connected to an output terminal of the scan control circuit SC corresponding to the $(N-m)^t$ row of sub-pixels 3, and the second scan signal terminal Scan(N+) corresponding to the $N^{th}$ row of sub-pixels 3 is further electrically connected to an output terminal of the scan control circuit SC corresponding to the $(N+n)^{th}$ row of sub-pixels 3. Here, m is an integer greater than or equal to 0, and n is a positive integer.

Correspondingly, in the fingerprint recognition mode, the second processing circuit 42 provides the second light emission control signal Emit2 to the first node N1 This process includes the following steps.

In the fingerprint recognition mode, in the first period T1, the second transistor M2 is switched on under control of an enabling level at the second control signal terminal CS2, the third transistor M3 is switched on control of an enabling level outputted by the scan control circuit SC corresponding to the $(N-m)^{th}$ row of sub-pixels 3, and a non-enabling level at the first voltage signal terminal VGH is transmitted to the first node N1 through the switched-on second transistor M2 and third transistor M3. In the second period T2, the second transistor M2 is switched on control of an enabling level at the second control signal terminal CS2, the fourth transistor M4 is switched on control of an enabling level outputted by the scan control circuit SC corresponding to the $(N+n)^{th}$ row of sub-pixels 3, and an enabling level at the second voltage signal terminal VGL is transmitted to the first node N1 through the switched-on fourth transistor M4 and second transistor M2.

The abovementioned processes have been described in the above embodiments, and details thereof will not be further described herein.

Figure 13:
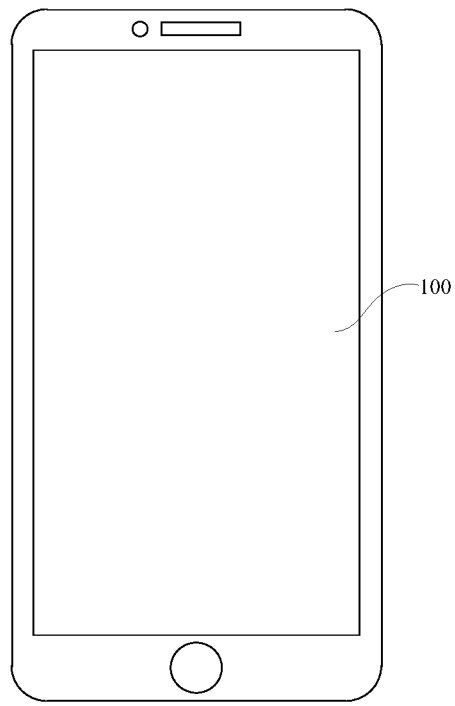
FIG. 13 is a schematic structural diagram of a display device according to an embodiment of the present disclosure.

An embodiment of the present disclosure provides a display device. As shown in FIG. 13, which is a schematic structural diagram of a display device according to an embodiment of the present disclosure, the display device includes the abovementioned display panel 100. The structure of the display panel 100 and the method for driving the display panel 100 have been described in details in the above embodiments, and will not be further described herein. Of course, the display device shown in FIG. 13 is merely illustrative, and the display device can be any electronic device having a display function, such as a cellphone, a tablet computer, a notebook computer, an electronic paper book, or a television.

The display device provided by the embodiment of the present disclosure includes the abovementioned display panel. Therefore, this display panel can reduce the brightness difference of the overall display image, thereby improving the user experience is improved, while improving the detection accuracy of fingerprint recognition.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A display panel, wherein the display panel is divided into a display area and a non-display area, the display area comprises a fingerprint recognition region and a non-fingerprint recognition region, a plurality of sub-pixels is arranged in the display area, and each of the plurality of sub-pixels comprises a pixel circuit and a light-emitting element that are electrically connected to each other;

wherein the display panel further comprises a plurality of control units, one of the plurality of control units corresponds to one row of sub-pixels of the plurality of sub-pixels within the fingerprint recognition region, and each of the plurality of control units comprises at least one first processing circuit and at least one second processing circuit; for each sub-pixel located within the fingerprint recognition region, the pixel circuit is electrically connected to the first processing circuit and the second processing circuit of a corresponding control unit of the plurality of control units through a first node;

wherein operating modes of the display panel comprise a non-fingerprint recognition mode and a fingerprint recognition mode, and in both the non-fingerprint recognition mode and in the fingerprint recognition mode, a driving cycle of each pixel circuit comprises a first period and a second period, wherein the second period comprises a plurality of first sub-periods and a plurality of second sub-periods that are alternate;

wherein in the non-fingerprint recognition mode, for each sub-pixel located within the non-fingerprint recognition region, the pixel circuit receives and responds to a first light emission control signal, in each first period and in each second sub-period, the first light emission control signal is at a non-enabling level such that the corresponding light-emitting element does not emit light, and in each first sub-period, the first light emission control signal is at an enabling level such that the corresponding light-emitting element emits light; for each sub-pixel located within the fingerprint recognition region, the first processing circuit provides the first light emission control signal to the first node, and the pixel circuit responds to the first light emission control signal, in the first period and in each second sub-period, the first light emission control signal is at the non-enabling level such that the corresponding light-emitting element does not emit light, and in each first sub-period, the first light emission control signal is at the enabling level such that the corresponding light-emitting element emits light; and wherein in the fingerprint recognition mode, for each sub-pixel located within the non-fingerprint recognition region, the pixel circuit receives and responds to the first light emission control signal, in each first period and in each second sub-period, the first light emission control signal is at the non-enabling level such that the corresponding light-emitting element does not emit light, and in each first sub-period, the first light emission control signal is at an enabling level such that the corresponding light-emitting element emits light; for each sub-pixel located within the fingerprint recognition region, the second processing circuit provides a second light emission control signal to the first node, and the pixel circuit responds to the second light emission control signal, in each first period, the second light emission control signal is at the non-enabling level such that the corresponding light-emitting element does not emit light, and in each first sub-period and in each second sub-period, the second light emission control signal is at the enabling level such that the corresponding light-emitting element emits light.

2. The display panel according to claim 1, wherein the display panel is an organic light-emitting display panel;
the display panel further comprises a light sensation fingerprint recognition unit corresponding to the fingerprint recognition region; and
in the fingerprint recognition mode, the light-emitting element of each sub-pixel located within the fingerprint recognition region is reused as a light source for fingerprint recognition.

3. The display panel according to claim 1, wherein each of the plurality of control units comprises one first processing circuit and one second processing circuit; and
wherein in the fingerprint recognition region, pixel circuits of a same row of sub-pixels are electrically connected to the first processing circuit and the second processing circuit of one of the plurality of control units corresponding to the same row of sub-pixels.

4. The display panel according to claim 1, wherein in the fingerprint recognition region, one row of sub-pixels comprises M sub-pixels, and each of the plurality of control units comprises M control sub-units, each control sub-unit comprises one first processing circuit and one second processing circuit, and M is a positive integer; and
wherein in the fingerprint recognition region, each control sub-unit corresponds to one sub-pixel located within the fingerprint recognition region, and the pixel circuit of each sub-pixel is electrically connected to the first processing circuit and the second processing circuit of the corresponding control sub-unit.

5. The display panel according to claim 1, wherein each of the at least one first processing circuit comprises a transistor, and the transistor has a control electrode electrically connected to a control signal terminal, a first electrode electrically connected to a light emission control signal terminal for providing the first light emission control signal, and a second electrode electrically connected to the first node.

6. The display panel according to claim 5, wherein a plurality of cascaded light emission control circuits is provided in the non-display area, wherein one row of sub-pixels located within the fingerprint recognition region corresponds to a corresponding one of the plurality of cascaded light emission control circuits; and
wherein in the fingerprint recognition region, the light emission control signal terminal is electrically connected to an output terminal of the light emission control circuit.

7. The display panel according to claim 1, wherein the second processing circuit comprises a first transistor, and the first transistor has a control electrode electrically connected to a control signal terminal, a second electrode electrically connected to the first node, and a first electrode configured to receive the second light emission control signal.

8. The display panel according to claim 7, wherein the second processing circuit further comprises a second transistor and a third transistor,
wherein the second transistor has a control electrode electrically connected to a first scan signal terminal, a first electrode electrically connected to a first voltage signal terminal, and a second electrode electrically connected to the first electrode of the first transistor;
the second transistor is switched on under control of an enabling level at the first scan signal terminal, and a non-enabling level at the first voltage signal terminal is transmitted to the first electrode of the first transistor through the switched-on second transistor;
the third transistor has a control electrode electrically connected to a second scan signal terminal, a first electrode electrically connected to a second voltage signal terminal, and a second electrode connected to the first electrode of the first transistor; and
the third transistor is switched on under control of an enabling level at the second scan signal terminal, and an enabling level of the second voltage signal terminal is transmitted to the first electrode of the first transistor through the switched-on third transistor.

9. The display panel according to claim 8, wherein a plurality of cascaded scan control circuits is provided in the non-display area, and one row of sub-pixels located within the fingerprint recognition region corresponds to a corresponding one of the plurality of cascaded scan control circuits;
in the fingerprint recognition region, the first scan signal terminal corresponding to an $N^{th}$ row of sub-pixels is electrically connected to an output terminal of the scan control circuit corresponding to an $(N-m)^{th}$ row of sub-pixels; the second scan signal terminal corresponding to the $N^{th}$ row of sub-pixels is electrically connected to an output terminal of the scan control circuit corresponding to an $(N+n)^{th}$ row of sub-pixels; and wherein m is an integer greater than or equal to 0, n is a positive integer, and N is a positive integer.

10. The display panel according to claim 9, wherein m=2 and n=1.

11. The display panel according to claim 1, wherein the display panel further comprises a capacitor; and wherein the capacitor has a first electrode electrically connected to a fixed voltage signal terminal, and a second electrode electrically connected to the first node.

12. The display panel according to claim 1, wherein the pixel circuit comprises:

a first control transistor having a control electrode electrically connected to the first node, a first electrode electrically connected to a power signal terminal, and a second electrode;

a driving transistor having a control electrode electrically connected to a control signal terminal, a first electrode electrically connected to the second electrode of the first control transistor; and a second electrode;

a second control transistor having a control electrode electrically connected to the first node, a first electrode electrically connected to the second electrode of the driving transistor, and a second electrode electrically connected to the light-emitting element; and a capacitor having a first electrode electrically connected to the power signal terminal, and a second electrode electrically connected to the control signal terminal.

13. The display panel according to claim 1, wherein the at least one first processing circuit and the at least one second processing circuit are located in the non-display area.

14. A method for driving a display panel, wherein the display panel is divided into a display area and a non-display area, the display area comprises a fingerprint recognition region and a non-fingerprint recognition region, a plurality of sub-pixels is arranged in the display area, and each of the plurality of sub-pixels comprises a pixel circuit and a light-emitting element that are electrically connected to each other;

wherein the display panel further comprises a plurality of control units, one of the plurality of control units corresponds to one row of sub-pixels of the plurality of sub-pixels within the fingerprint recognition region, and each of the plurality of control units comprises at least one first processing circuit and at least one second processing circuit; for each sub-pixel located within the fingerprint recognition region, the pixel circuit is electrically connected to the first processing circuit and the second processing circuit of a corresponding control unit of the plurality of control units through a first node;

wherein operating modes of the display panel comprise a non-fingerprint recognition mode and a fingerprint recognition mode, and in both the non-fingerprint recognition mode and in the fingerprint recognition mode, a driving cycle of each pixel circuit comprises a first period and a second period, wherein the second period comprises a plurality of first sub-periods and a plurality of second sub-periods that are alternate;

wherein in the non-fingerprint recognition mode, for each sub-pixel located within the non-fingerprint recognition region, the pixel circuit receives and responds to a first light emission control signal, in each first period and in each second sub-period, the first light emission control signal is at a non-enabling level such that the corresponding light-emitting element does not emit light, and in each first sub-period, the first light emission control signal is at an enabling level such that the corresponding light-emitting element emits light; for each sub-pixel located within the fingerprint recognition region, the first processing circuit provides the first light emission control signal to the first node, and the pixel circuit responds to the first light emission control signal, in the first period and in each second sub-period, the first light emission control signal is at the non-enabling level such that the corresponding light-emitting element does not emit light, and in each first sub-period, the first light emission control signal is at the enabling level such that the corresponding light-emitting element emits light; and wherein in the fingerprint recognition mode, for each sub-pixel located within the non-fingerprint recognition region, the pixel circuit receives and responds to the first light emission control signal, in each first period and in each second sub-period, the first light emission control signal is at the non-enabling level such that the corresponding light-emitting element does not emit light, and in each first sub-period, the first light emission control signal is at an enabling level such that the corresponding light-emitting element emits light; for each sub-pixel located within the fingerprint recognition region, the second processing circuit provides a second light emission control signal to the first node, and the pixel circuit responds to the second light emission control signal, in each first period, the second light emission control signal is at the non-enabling level such that the corresponding light-emitting element does not emit light, and in each first sub-period and in each second sub-period, the second light emission control signal is at the enabling level such that the corresponding light-emitting element emits light, wherein operating modes of the display panel comprise a non-fingerprint recognition mode and a fingerprint recognition mode, and in both the non-fingerprint recognition mode and in the fingerprint recognition mode, a driving cycle of each pixel circuit comprises a first period and a second period, the second period comprising a plurality of first sub-periods and a plurality of second sub-periods that are alternate; and the method for driving the display panel comprises:

in the non-fingerprint recognition mode, for each sub-pixel located within the non-fingerprint recognition region, the pixel circuit receiving and responding to a first light emission control signal, in each first period and in each second sub-period, the first light emission control signal being at a non-enabling level, the corresponding light-emitting element emitting no light, and in each first sub-period, the first light emission control signal being at an enabling level, the corresponding light-emitting element emitting light; for each sub-pixel located within the fingerprint recognition region, the first processing circuit providing the first light emission control signal to the first node, and the pixel circuit responding to the first light emission control signal, in each first period and in each second sub-period, the first light emission control signal being at the non-enabling level, the corresponding light-emitting element emitting no light, and in each first sub-period, the first light emission control signal being at the enabling level, the corresponding light-emitting element emitting light;

in the fingerprint recognition mode, for each sub-pixel located within the non-fingerprint recognition region, the pixel circuit receiving and responding to a first light emission control signal, in each first period and in each second sub-period, the first light emission control signal being at the non-enabling level, the corresponding light-emitting element emitting light, and in each first sub-period, the first light emission control signal being at the enabling level, the corresponding light-emitting element emitting light; for each sub-pixel located within the fingerprint recognition region, the second processing circuit providing a second light emission control signal to the first node, and the pixel circuit responding to the second light emission control signal, in each first period, the second light emission control signal being at the non-enabling level, the corresponding light-emitting element emitting no light, and in each first sub-period and in each second sub-period, the second light emission control signal being at the enabling level, and the corresponding light-emitting element emitting light.

15. The method according to claim 14, wherein each of the at least one first processing circuit comprises a first transistor, and the first transistor has a control electrode electrically connected to a first control signal terminal, a first electrode electrically connected to a light emission control signal terminal for providing the first light emission control signal, and a second electrode electrically connected to the first node, a plurality of cascaded light emission control circuits is provided in the non-display area, wherein each row of sub-pixels located within the fingerprint recognition region corresponds to a corresponding one of the plurality of cascaded light emission control circuits; in the fingerprint recognition region, the light emission control signal terminal is electrically connected to an output terminal of the light emission control circuit, in the non-fingerprint recognition mode, the step of the first processing circuit providing the first light emission control signal to the first node comprises:

in the first period and in each second sub-period, the first transistor being switched on under control of an enabling level at the first control signal terminal, and a non-enabling level outputted by the light emission control circuit corresponding to the first transistor being transmitted to the first node through the switched-on first transistor; and in each first sub-period, the first transistor being switched on under control of an enabling level at the first control signal terminal, and an enabling level outputted by the light emission control circuit corresponding to the first transistor being transmitted to the first node through the switched-on first transistor.

16. The method according to claim 14, wherein each of the at least one second processing circuit comprises: a first transistor, a second transistor and a third transistor, wherein the first transistor has a control electrode electrically connected to a control signal terminal, a second electrode electrically connected to the first node, and a first electrode;

the second transistor has a control electrode electrically connected to a first scan signal terminal, a first electrode electrically connected to a first voltage signal terminal, and a second electrode electrically connected to the first electrode of the first transistor;

the third transistor has a control electrode electrically connected to a second scan signal terminal, a first electrode electrically connected to a second voltage signal terminal, and a second electrode connected to the first electrode of the first transistor;

a plurality of cascaded scan control circuits is provided in the non-display area, and each row of sub-pixels located within the fingerprint recognition region corresponds to a corresponding one of the plurality of cascaded scan control circuits; in the fingerprint recognition region, the first scan signal terminal corresponding to an $N^{th}$ row of sub-pixels is electrically connected to an output terminal of the scan control circuit corresponding to an $(N-m)^{th}$ row of sub-pixels; the second scan signal terminal corresponding to the $N^{th}$ row of sub-pixels is further electrically connected to an output terminal of the scan control circuit corresponding to an $(N+n)^{th}$ row of sub-pixels;

wherein m is an integer greater than or equal to 0, n is a positive integer, and N is a positive integer, in the fingerprint recognition mode, the step of the second processing circuit providing the second light emission control signal to the first node comprises:

in the first period, the first transistor being switched on under control of an enabling level at the control signal terminal, the second transistor being switched on under control of an enabling level outputted by the scan control circuit corresponding to the $(N-m)^{th}$ row of sub-pixels, and a non-enabling level at the first voltage signal terminal being transmitted to the first node through the switched-on second transistor and first transistor; and in the second period, the first transistor being switched on under control of the enabling level at the control signal terminal, the third transistor being switched on under control of an enabling level outputted by the scan control circuit corresponding to the $(N+n)^{th}$ row of sub-pixels, and an enabling level at the second voltage signal terminal being transmitted to the first node through the switched-on third transistor and first transistor.

17. A display device, comprising a display panel, wherein the display panel is divided into a display area and a non-display area, the display area comprises a fingerprint recognition region and a non-fingerprint recognition region, a plurality of sub-pixels is arranged in the display area, and each of the plurality of sub-pixels comprises a pixel circuit and a light-emitting element that are electrically connected to each other;

the display panel further comprises a plurality of control units, one of the plurality of control units corresponds to one row of sub-pixels of the plurality of sub-pixels within the fingerprint recognition region, and each of the plurality of control units comprises at least one first processing circuit and at least one second processing circuit; for each sub-pixel located within the fingerprint recognition region, the pixel circuit is electrically connected to the first processing circuit and the second processing circuit of a corresponding control unit of the plurality of control units through a first node; and operating modes of the display panel comprise a non-fingerprint recognition mode and a fingerprint recognition mode, and in both the non-fingerprint recognition mode and in the fingerprint recognition mode, a driving cycle of each pixel circuit comprises a first period and a second period, wherein the second period comprises a plurality of first sub-periods and a plurality of second sub-periods that are alternate;

in the non-fingerprint recognition mode, for each sub-pixel located within the non-fingerprint recognition region, the pixel circuit receives and responds to a first light emission control signal, in each first period and in each second sub-period, the first light emission control signal is at a non-enabling level such that the corresponding light-emitting element does not emit light, and in each first sub-period, the first light emission control signal is at an enabling level such that the corresponding light-emitting element emits light; for each sub-pixel located within the fingerprint recognition region, the first processing circuit provides the first light emission control signal to the first node, and the pixel circuit responds to the first light emission control signal, in the first period and in each second sub-period, the first light emission control signal is at the non-enabling level such that the corresponding light-emitting element does not emit light, and in each first sub-period, the first light emission control signal is at the enabling level such that the corresponding light-emitting element emits light;

in the fingerprint recognition mode, for each sub-pixel located within the non-fingerprint recognition region, the pixel circuit receives and responds to the first light emission control signal, in each first period and in each second sub-period, the first light emission control signal is at the non-enabling level such that the corresponding light-emitting element does not emit light, and in each first sub-period, the first light emission control signal is at an enabling level such that the corresponding light-emitting element emits light; for each sub-pixel located within the fingerprint recognition region, the second processing circuit provides a second light emission control signal to the first node, and the pixel circuit responds to the second light emission control signal, in each first period, the second light emission control signal is at the non-enabling level such that the corresponding light-emitting element does not emit light, and in each first sub-period and in each second sub-period, the second light emission control signal is at the enabling level such that the corresponding light-emitting element emits light.

* * * * *